Dec. 9, 1958     D. ROBBINS     2,863,681
INFLATABLE SEAL FOR ROTATING SHAFTS
Filed Oct. 4, 1955
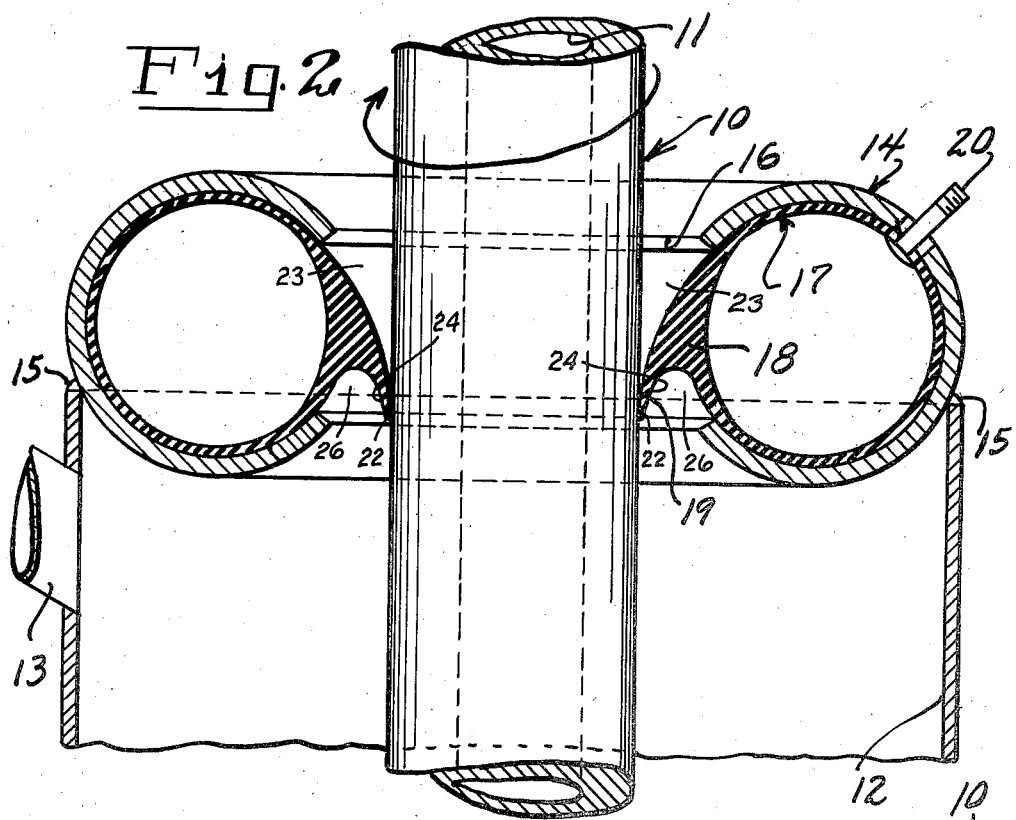
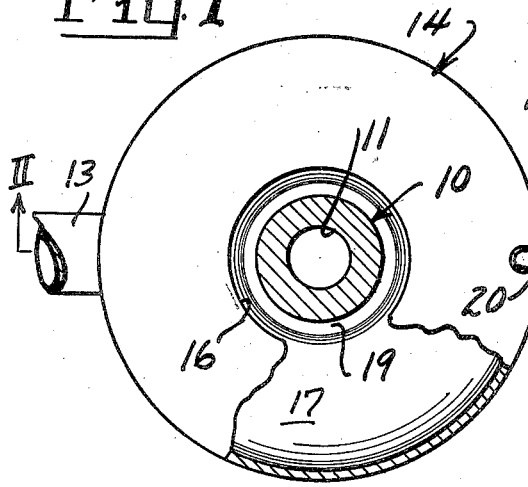
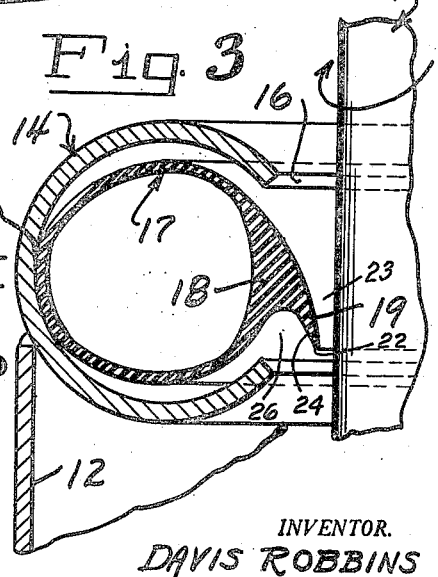
INVENTOR.
DAVIS ROBBINS
BY Jennings & Carter
Attorneys

United States Patent Office 2,863,681
Patented Dec. 9, 1958

2,863,681

INFLATABLE SEAL FOR ROTATING SHAFTS

Davis Robbins, Oneonta, Ala., assignor to Robbins Machine & Mfg. Co., Inc., a corporation of Alabama Application October 4, 1955, Serial No. 538,413

3 Claims. (Cl. 286—26)

My invention relates to means for sealing around a rotating shaft or the like, such for instance as to close an opening in a housing or casing into which the shafts project.

An object of my invention is to provide a seal which is particularly adapted to form an air tight closure around a rotating shaft where the same projects through a housing, as to seal the shaft opening of a dust hood or the like.

Another object is to provide means for sealing around the outer surface of a rotating shaft or the like which comprises essentially an annular sealing member adapted to be held against the shaft, and means to apply fluid pressure to the member to hold it in all-around sealing engagement with the shaft.

Another object is to provide a seal of the character designated in which the annular sealing member is made of rubber-like material and projects from an annular opening in the inner periphery of a tore shaped housing, whereby the housing serves as a holder and confining member so that when the housing is filled with a fluid under pressure the sealing member is pressed tightly all around the shaft.

A more specific object is to provide means for sealing the shaft opening into a dust hood or the like through which projects a rotary drilling steel, said seal being adapted to be pressed against the steel by fluid pressure and being so constructed as to lie out of contact with the steel when not under pressure, permitting the steel to be withdrawn from the hood without disturbing the seal.

Briefly, my invention contemplates a generally toroidal shaped housing which is adapted to surround the rotating shaft or drill steel. On the inner periphery of the housing is an annular opening. Disposed to fit in the housing is a toroidal shaped rubber inner tube having a portion on its inner periphery adapted to contact the rotating shaft to form the seal. The tube is so molded or otherwise made that when not under pressure the sealing portion on the inner periphery thereof expands evenly away from and out of contact with the steel. This permits the steel to be withdrawn from the dust housing simply by deflating the inner tube. My invention thus provides a ready means for changing steels, rods, tools and the like in drilling operations and the like.

Apparatus illustrating features of my invention is shown in the accompanying drawings forming a part of this application in which:

Fig. 1 is a plan view of the device, certain parts being broken away and in section;

Fig. 2 is an enlarged detail sectional view taken generally along line II—II of Fig. 1 and showing the device in sealing position about a rotating shaft; and Fig. 3 is a fragmental sectional view showing the position of the device with the sealing member partially deflated.

Referring now to the drawings for a better understanding of my invention I illustrate the same in association with a hollow rotary drilling shaft indicated generally by the numeral 10. As is well understood in the art, in this type of drill steel air or other fluid under pressure is forced downwardly through a centrally disposed opening 11 in the shaft. The drill tool, not shown, is located on the lower end of the shaft. Air discharges through the lower end of the shaft 10, and brings the chips, dust and the like up the drill hole and into a dust hood or housing 12. The housing 12 may be provided with one or more outlets 13 to which suction may be applied, if desired, to assist the fluid introduced under pressure in the shaft 10 in removal of the dust. It will be understood that the housing 12 is made air tight to the top of the opening where it enters the earth's surface or the top of a cased opening, if there be a casing, so as to form a dust proof and air tight cap or hood over the same.

My invention consists of providing adjacent the top of the dust hood 12 means to seal about the surface of the rotating drill steel 10. As shown, I provide a generally toroidal shaped housing indicated by the numeral 14 and which may be welded as indicated at 15, or otherwise made air tight to the top of the hood 12. The housing has a minor diameter large enough to pass the shaft. On the inner periphery of the housing 14 is a continuously extending annular cut-out indicated at 16.

Adapted to fit in the toroidal shaped housing is a generally toroidal inner tube made of rubber or the like and indicated generally by the numeral 17. The tube may have a thickened annular portion 18 on its inner periphery which carries an integrally formed annular sealing lip 19 adapted, when the tube is inflated as will be explained, to press tightly against the shaft or steel 10 with a running, air tight fit. Air or other fluid under pressure may be admitted to the inside of the inner tube 17 through a valve stem 20. As shown in Fig. 2, the solid annular sealing lip 19 terminates in a relatively thin inner edge 22 which faces inwardly toward the dust hood 12. Lip 19 has an inwardly facing surface 23 which is arcuate and forms a smooth continuation of the outer circumference of the annular tube 17. An outwardly facing surface 24 of lip 19 forms an arcuate groove 26 between the lip 19 and the outer circumference of tube 17 on the side of tube 17 that faces the dust hood 12. Inwardly facing surface 23 contacts the shaft 10 when the tube is inflated and the force of fluid under pressure in dust hood 12 is exerted through groove 26 against the outwardly facing surface 24 to press inwardly facing surface 23 tightly against the shaft to prevent the escape of fluid pressure around the shaft.

From the foregoing the method of constructing and using my improved seal will be readily understood. The inner tube 17 may be made of rubber or synthetic flexible material similar to rubber, similar to automobile inner tubes. The tube 17 may be molded in such manner that when the interior is at atmospheric pressure the tube contracts substantially to the position shown in Fig. 3 of the drawings wherein the annular lip 19 is moved away from the surface of the shaft 10. When air is admitted through the valve 20 the section 18 and lip 19 move outwardly, thus contacting the shaft and providing the seal. It will be appreciated that due to the groove 26 formed by the lip 19, pressure within the chamber or housing 12 aids in holding the lip into contact with the surface of the shaft.

From the foregoing it will be seen that my invention provides a seal especially adapted for sealing around drilling rods, shafts, steels and the like. It is extremely easy to change rods or drilling steels with my improved seal simply by deflating the same, whereupon the steel may be withdrawn from the hole or a new steel inserted without having to take the seal apart as heretofore has been customary. It will be readily apparent that my invention is economical of manufacture and that it is fully effective for its intended purposes. If desired, the pressure within the tube 17 may be reduced below atmospheric by connecting the valve 20 to a source of vacuum, whereby the tube may be collapsed more fully, thereby to draw the lip 19 further away from the surface of the shaft 10. However, it seems preferable in most instances to so mold the tube that when deflated it draws away from the surface of the shaft with the amount of clearance desired to permit withdrawal of the shaft or steel. If desired the annular lip 19 can be made separable from the tube proper, or, the lip can be replaced when worn by vulcanizing a new lip onto the tube. In order to prevent the tube from shifting about in the housing 14, a section of the periphery thereof may be secured in any suitable manner to the inside of the housing as indicated at 21, Fig. 3.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In a packing for a dust hood, a toroidal shaped housing secured to the dust hood in fluid tight relation, a hollow rotary shaft passing through the housing into the dust hood, said housing having an annular opening therein facing the shaft, means to introduce fluid under pressure into the hood, an annular inflatable tube mounted in the housing with at least a portion thereof extending through the annular opening in the housing, a solid annular sealing lip on the inner side of said tube terminating in a relatively thin inner edge facing inwardly toward the dust hood and adjacent the shaft, an inwardly facing surface of said lip being arcuate and forming a smooth continuation of the outer circumference of said annular tube, an outwardly facing surface of said lip forming an arcuate groove on the side of the tube facing the dust hood, said inwardly facing surface contacting the shaft when the tube is inflated with the force of fluid under pressure in said hood being exerted against the outwardly facing surface of said lip to press the inwardly facing surface tightly against the shaft and thereby prevent the escape of fluid around the shaft, a dust outlet in a side of the dust hood, and means to inflate and deflate the tube.

2. The combination set forth in claim 1 in which the tube is secured to the outer wall of the housing whereby when the tube is deflated the sealing lip is withdrawn from the shaft, thereby permitting withdrawal of the shaft through the housing.

3. In a packing for a dust hood, a toroidal shaped housing secured to the dust hood in fluid tight relation, a hollow rotary shaft passing through the housing into the dust hood, said housing having an annular opening therein facing the shaft, means to introduce fluid under pressure into the hood, an annular inflatable tube mounted in the housing with at least a portion thereof extending through the annular opening in the housing, a solid annular sealing lip on the inner side of said tube terminating in a relatively thin inner edge facing inwardly toward the dust hood and adjacent the shaft, an inwardly facing surface of said lip being arcuate and forming a smooth continuation of the outer circumference of said annular tube, an outwardly facing surface of said lip facing the dust hood and being exposed to the fluid under pressure therein, said inwardly facing surface contacting the shaft when the tube is inflated with the force of fluid pressure in said hood being exerted against the outwardly facing surface of said lip to press the inwardly facing surface tightly against the shaft and thereby prevent the escape of fluid around the shaft, a dust outlet in a side of the dust hood, and means to inflate and deflate the tube.

References Cited in the file of this patent

UNITED STATES PATENTS

| | | |
|---|---|---|
| 1,319,464 | Durbin | Oct. 21, 1919 |
| 1,472,952 | Anderson | Nov. 6, 1923 |
| 2,606,046 | Bonner et al. | Aug. 5, 1952 |
| 2,705,016 | Saar | Mar. 29, 1955 |